United States Patent
Shimotsuji et al.

[11] Patent Number: 5,815,704
[45] Date of Patent: Sep. 29, 1998

[54] DOCUMENT FILING APPARATUS AND METHOD HAVING DOCUMENT REGISTRATION, COMPARISON AND RETRIEVAL CAPABILITIES

[75] Inventors: Shigeyoshi Shimotsuji; Hiroaki Kubota; Mieko Asano; Osamu Hori, all of Kanagawa-ken, Japan

[73] Assignee: Kabushiki Kaisha Toshiba, Kanagawa-ken, Japan

[21] Appl. No.: 592,706

[22] Filed: Jan. 26, 1996

[30] Foreign Application Priority Data

Feb. 22, 1995 [JP] Japan .................................... 7-034002

[51] Int. Cl.⁶ ........................................................ G06F 17/21
[52] U.S. Cl. .......................... 395/615; 395/616; 395/771; 395/935; 382/190; 382/286; 382/287; 382/290
[58] Field of Search ..................................... 395/615, 616, 395/771, 935; 382/290, 286, 287, 190

[56] References Cited

U.S. PATENT DOCUMENTS

| | | | |
|---|---|---|---|
| 4,926,490 | 5/1990 | Mano | 382/9 |
| 5,101,448 | 3/1992 | Kawachiya et al. | 382/61 |
| 5,377,348 | 12/1994 | Lau et al. | 395/600 |
| 5,379,127 | 1/1995 | Ando | 358/448 |
| 5,471,549 | 11/1995 | Kurosu et al. | 382/290 |
| 5,579,419 | 11/1996 | Yaguchi et al. | 382/305 |
| 5,583,941 | 12/1996 | Yoshida et al. | 380/51 |
| 5,590,317 | 12/1996 | Iguchi et al. | 395/602 |
| 5,592,574 | 1/1997 | Chilton et al. | 382/295 |

*Primary Examiner*—Thomas G. Black
*Assistant Examiner*—Jean R. Homere
*Attorney, Agent, or Firm*—Finnegan, Henderson, Farabow, Garrett & Dunner, L.L.P.

[57] ABSTRACT

In a document filing apparatus, a file memory previously stores a plurality of documents including of line data, character data and image data. An image input section inputs a new document as image data. A character-line extraction section extracts line data and character data from the input image data. A document retrieval section retrieves a document to be compared with the new document from the file memory. A difference detection section detects differences of line data, character data and image data between the new document and the retrieved document. A register section registers the difference data and identification information of the retrieved document as the new document in the file memory.

17 Claims, 15 Drawing Sheets

CHARACTER OF FORM A

CHARACTER: (x10, y10): "NAME: AZ99100"
CHARACTER: (x11, y11): "TIME: 1994-7-14"
CHARACTER: (x12, y12): "CHANGE PART"

IMAGE DATA OF FORM A

EXTRACTION OF RECTANGLE

EXTRACTION OF MID POINT OF RECTANGLE

EXTRACTION OF CIRCUMSCRIBED RECTANGLE

DOCUMENT FILING APPARATUS AND METHOD HAVING DOCUMENT REGISTRATION, COMPARISON AND RETRIEVAL CAPABILITIES

BACKGROUND OF THE INVENTION

1. Field of the Invention

The present invention relates to a document filing apparatus and method for effectively registering a new document in file memory and for easily retrieving the document from the file memory.

2. Description of the Related Art

In the document filing apparatus of the prior art, various filing methods have been developed. As a first method, when image data of one document is inputted, the image data and name to be retrieved are stored in file memory. As a second method, character information and figure information are converted to code information. The code information is only stored in file memory, which is called a code file. As a third method, a part of the image data is only stored instead of all of the image data. For example, by referring to the format of a blank form, the contents in the form is only stored in file memory.

However, in the first method, the user must take action to assign a name to respective document data. In the second method, the user must take action to change the character/figure information to code information. Therefore, these methods are troublesome for the user. In the third method, the user must prepare various kinds of blank forms. Therefore, the work for registering the various kinds of blank forms is troublesome for the user.

On the other hand, in data retrieval methods of the prior art, as a first method, a predetermined keyword is inputted to retrieve data desired by a user. As a second method, a plurality of form data registered in the file memory are displayed in order and the user selects one form in which he wants to observe the document.

However, in the first method, it is difficult to exactly retrieve the user's desired document by the keyword only. In the second method, it takes a long time to retrieve by displaying the form data in order if a lot of documents are stored in the file memory.

SUMMARY OF THE INVENTION

It is an object of the present invention to provide a document filing apparatus and method for effectively registering a new document in file memory and for easily retrieving the document from the file memory.

According to the present invention, there is provided a document filing apparatus, comprising; file means for storing a plurality of documents having line data, character data and image data; image input means for inputting image data of a new document; character-line extraction means for extracting line data and character data from the input image data; document retrieval means for retrieving from the file means one of the stored documents to be compared with the new document; difference detection means for detecting the differences, which are designated as "difference data", of line data, character data and image data between the new document and the retrieved document; and register means for registering the difference data and identification information of the retrieved document as the new document in said file means.

Further in accordance with the present invention, there is provided a document filing apparatus, comprising; file means for storing a plurality of documents having line data, character data and image data; image input means for inputting image data of a new document; character-line extraction means for extracting line data and character data from the input image data; difference detection means for calculating difference data between the new document and each document stored in said file means, and for determining the one of the stored documents for which the difference data is smallest; and register means for registering the difference data and identification information for the determined document as the new document in said file means.

Further in accordance with the present invention, there is also provided a document filing apparatus, comprising; file means for storing image data of a plurality of documents; image input means for inputting imaga data of a new document; extraction means for extracting line data from the new document input image data and extracting ones of the plurality of rectangles included in the new document according to the line data; rectangle calculation means for calculating a coordinate value of a mid-point of each extraccted rectangle, and for calculating a circumscribed rectangle which includes the plurality of rectangles; document retrieval means for retrieving image data of one of the stored documents from the file means, for calculating coordinate values of mid-points of a plurality of rectangles of the retrieved document, and for calculating a circumscribed rectangle which includes the plurality of the rectangles of the retrieved document; means for determining if a size of the circumscribed rectangle of the new document is the same as a size of the circumscribed of the retrieved document and, if the same size, for checking if the coordinate value of the mid-point of each rectangle of the new document overlaps the mid-point of each rectangle of the retrieved document; selection means for selecting rectangles of the retrieved document whose mid-point coordinate value coincides with one of the mid-point coordinate values of the new document; and output means for, if a selection ratio of a number of the selected rectangles to a total number of all rectangles of the retrieved document is above a threshold value, outputting the retrieved document as a retrieval result.

DETAILED DESCRIPTION OF THE PREFERRED EMBODIMENTS

Figure 1:
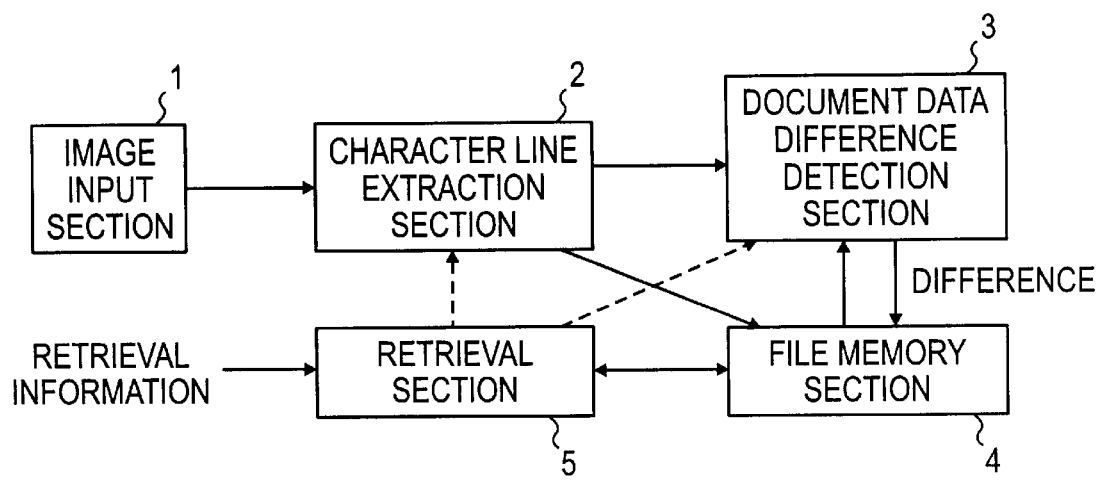
FIG. 1 is a schematic diagram of a document filing apparatus according to a first embodiment of the present invention.

A first embodiment of the present invention will be explained in detail. FIG. 1 is a schematic diagram of a document filing apparatus according to the first embodiment. In the first embodiment, a form is used as the document.

The document filing apparatus of the first embodiment includes an image input section 1 for inputting image data of the form, a character line extraction section 2 for extracting character/line data from image data, a document data difference detection section 3 for detecting differences between a new form and a registered form, a file memory section 4 for storing form data, and a retrieval section 5 for retrieving the registered form similar to the new form.

Figure 2:
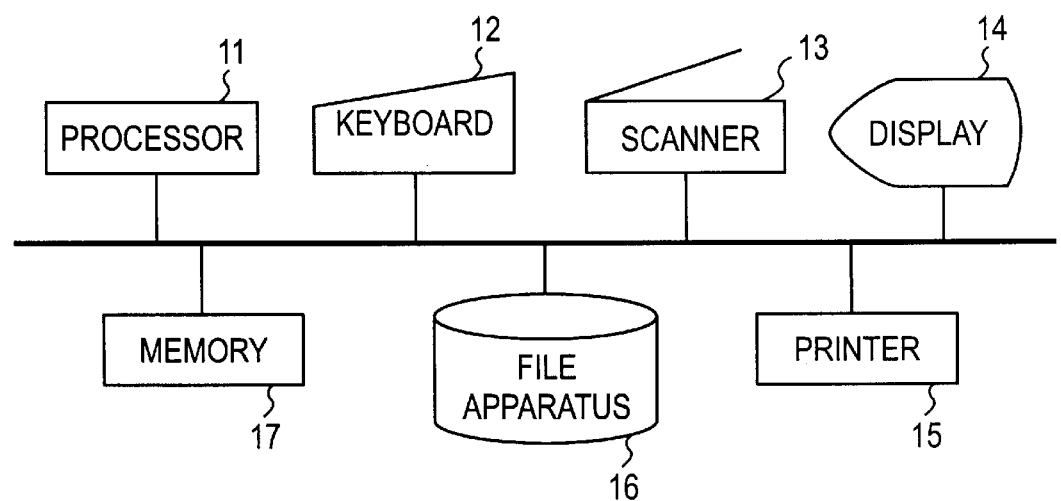
FIG. 2 is a schematic diagram of hardware of the document filing apparatus according to the first embodiment.

FIG. 2 is a schematic diagram of hardware of the document filing apparatus according to the first embodiment. The hardware of the first embodiment includes a processor 11, a scanner 13, a file apparatus 16, and a memory 17. The scanner 13 scans the new form. The processor 11 executes various kinds of processing (line/character extraction, form-retrieval extraction, difference-data extraction, etc.) according to programs stored in the memory 17. Then, the file apparatus 16 stores the processing result. In this case, the file apparatus 16 retrieves the registered form through the keyboard 12 and outputs the retrieved form through the display 14. The printer 15 outputs the registered form to the user.

Figure 3:
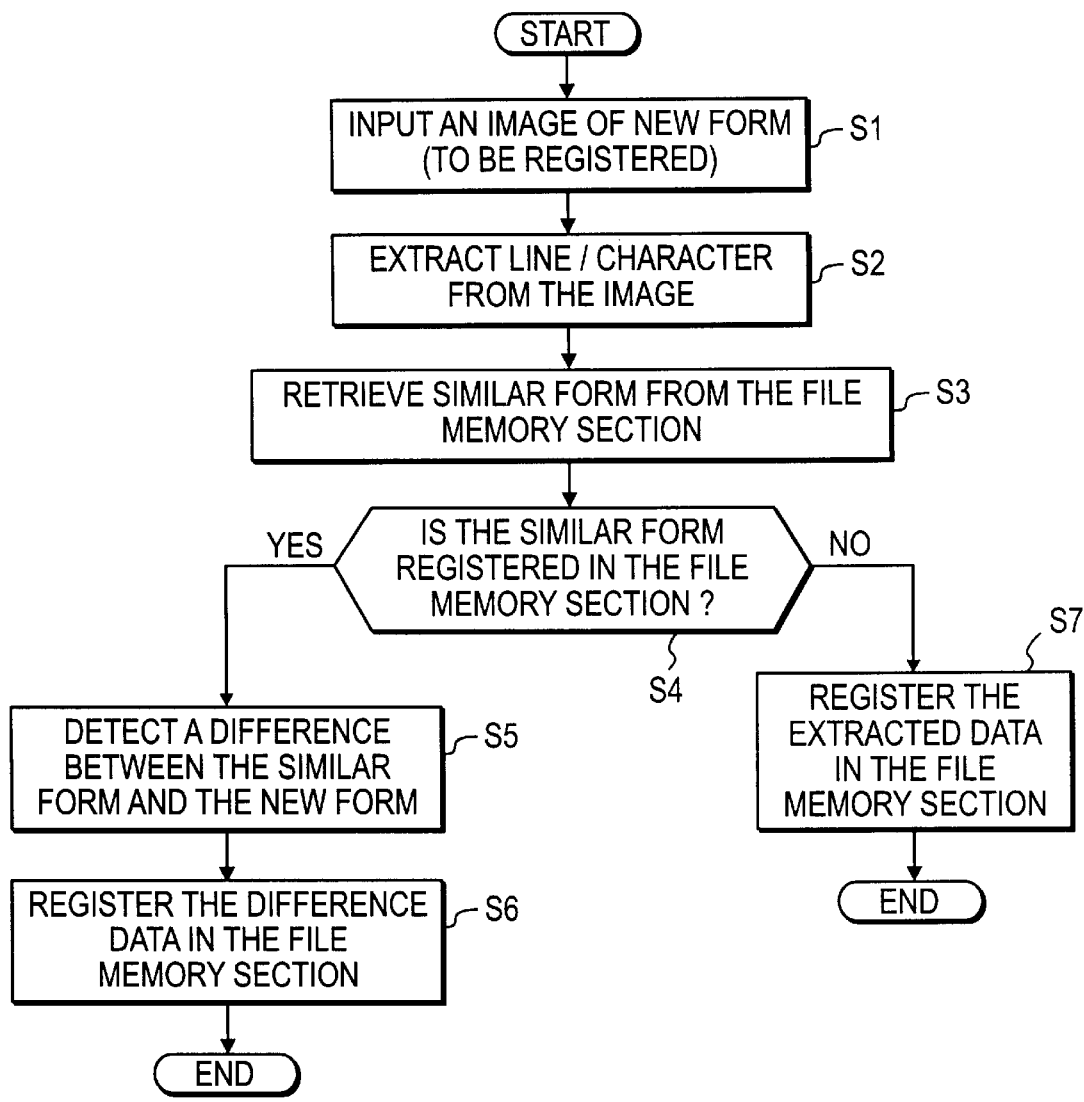
FIG. 3 is a flow chart of processing of the document filing apparatus according to the first embodiment.
Figure 4:
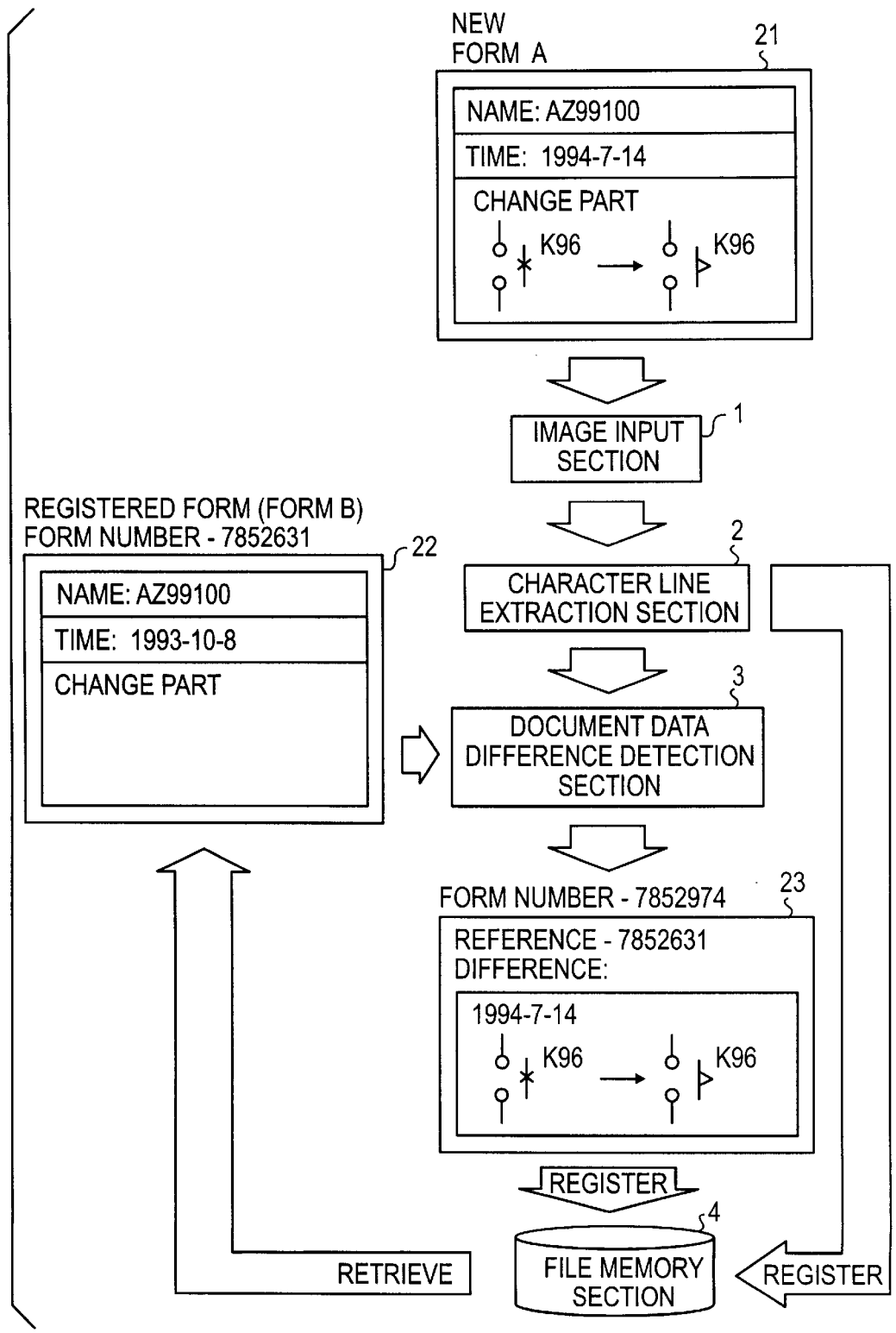
FIG. 4 is a schematic diagram of an example of processing of the document filing apparatus according to the first embodiment.

FIG. 3 is a flow chart of processing of the document filing apparatus and FIG. 4 is a schematic diagram of an example of processing of the document filing apparatus according to the first embodiment. Firstly, the image input section 1 (i.e., image scanner) inputs a new form to be registered as image data. For example, new form A 21 as shown in FIG. 4 is inputted as the image data. The character line extraction section 2 extracts line/character from the input image data. The retrieval section 5 retrieves a registered form similar to the new form from the file memory section 4. (For example, in FIG. 4, the form B 22 similar to the form A is retrieved.) If a similar form is registered in the file memory 4, the document data difference detection section 3 detects the difference of the image data between the new form and the similar form. The difference data and the specified information of the similar form (i.e., form number) are registered in the file memory section 4. For example, in FIG. 4, the difference data 23 and the form number 7852631 of the form B are registered. (The form number 7852974 is a number newly added to the form A) On the other hand, if a similar form is not registered in the file memory 4, line data and character data extracted from the input image data are registered in the file memory section 4. In the first embodiment, the form A is reconstructed by combining the form B and the difference data.

Next, processing steps according to the first embodiment will be explained by referring to the flow chart shown in FIG. 3.

(step S1)

The form A to be registered is inputted as image data through the image input section 1.

(step S2)

The character line extraction section 2 extracts line data and character data from the input image data. Other image area which is not extracted as the line data and the character data is referred to as image data. In this example, the line data are horizontal/vertical lines forming a rectangle, a diagonal line of the rectangle, a horizontal line not forming the rectangle. In extraction of character data, a black area forming a rectangle, except for the line, is extracted and each character is recognized in a character line corresponding to the black area. If the area is recognized correctly as a character, the character data is outputted.

Figure 5:
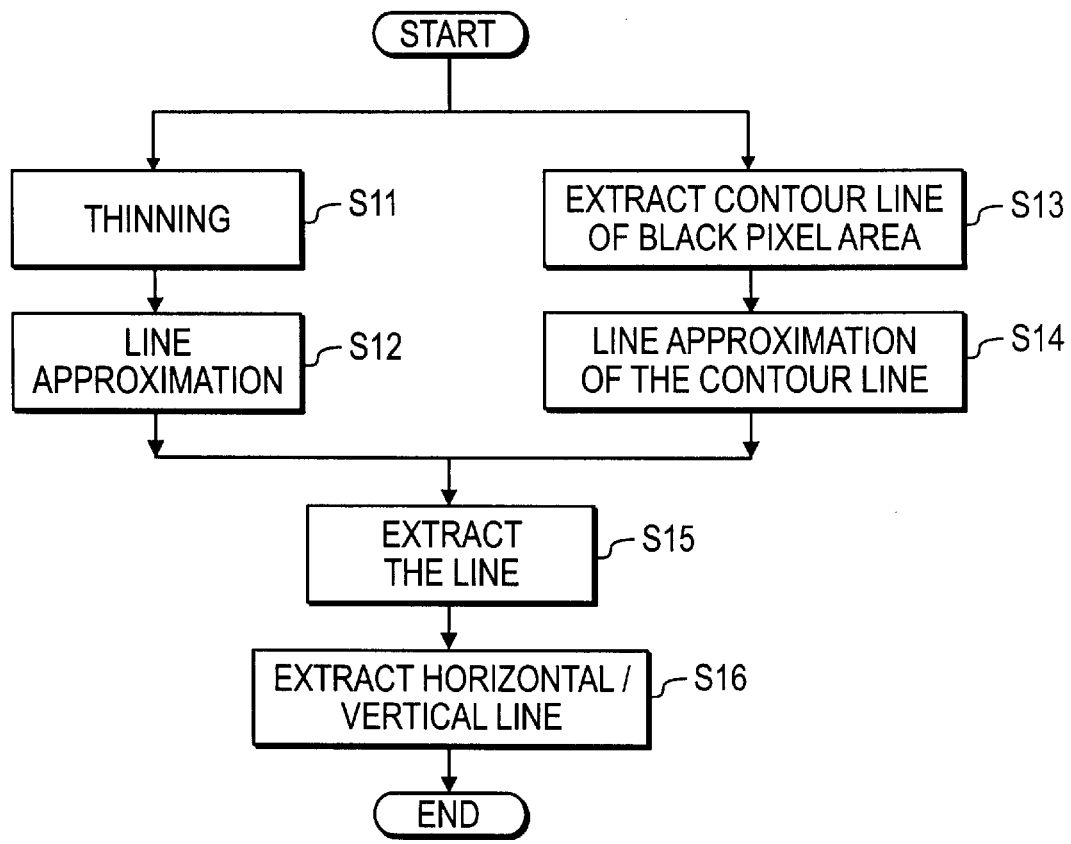
FIG. 5 is a flow chart of extraction processing of a straight line according to the first embodiment.

FIG. 5 is a flow chart of extraction processing of a straight line. Firstly, thinning processing is executed in the input image (S11) and the thin line is approximated (S12). At the same time, a contour line of black pixel area is extracted from the input image (S13) and the contour line is approximated (S14). Next, the approximated line is processed. In a group of approximated lines being processed, a line is extracted by linking a start point and an end point in the approximated contour line area. The extracted line whose length is maximum among those of the extracted lines is outputted as line data (step S15). This extraction processing is repeated for all of the thin lines. Among the extracted lines, horizontal line and vertical line are selected (step S16).

Figure 6:
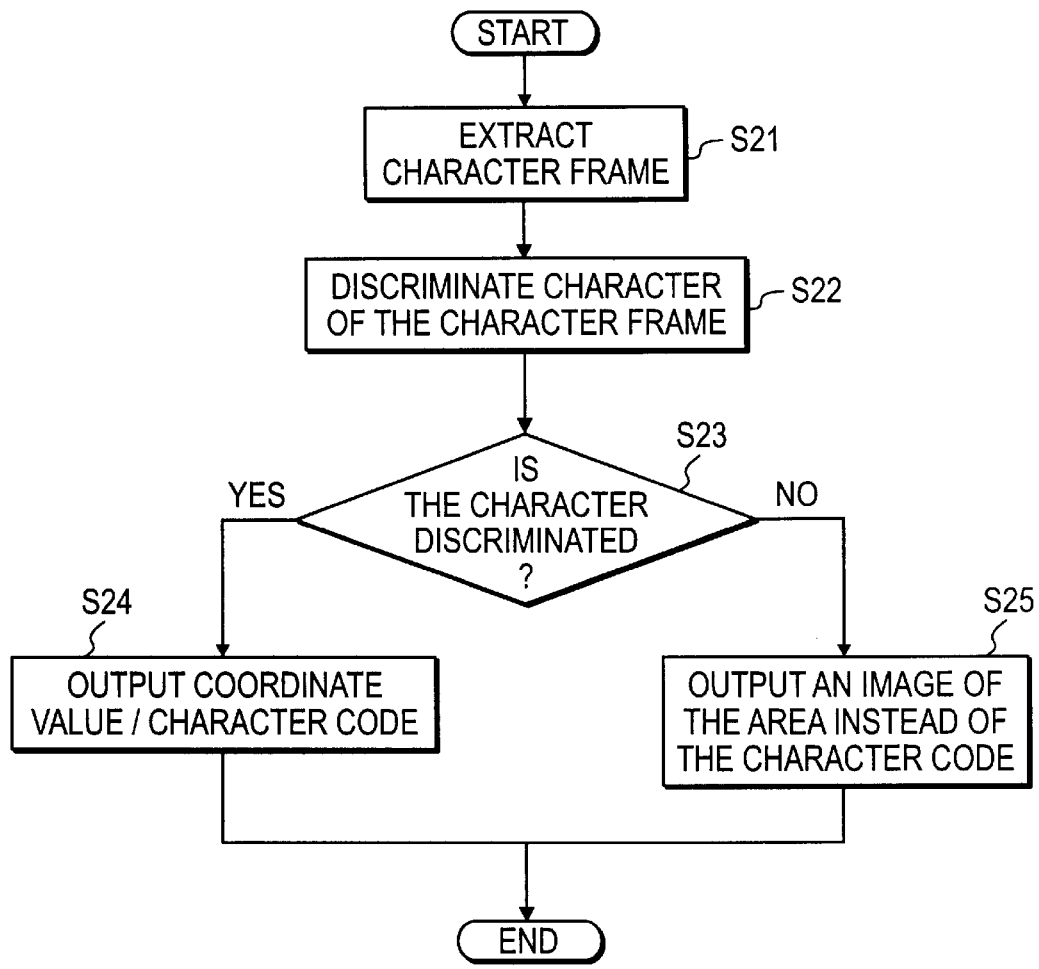
FIG. 6 is a flow chart of extraction processing of a character according to the first embodiment.
Figure 7:
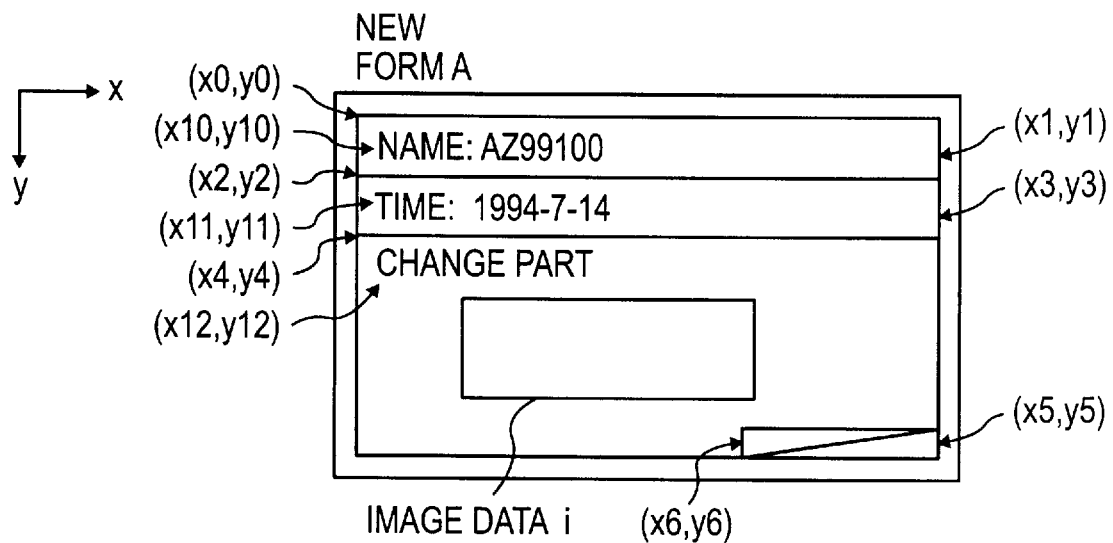
FIG. 7 is a schematic diagram of an example of a form.
Figure 8:
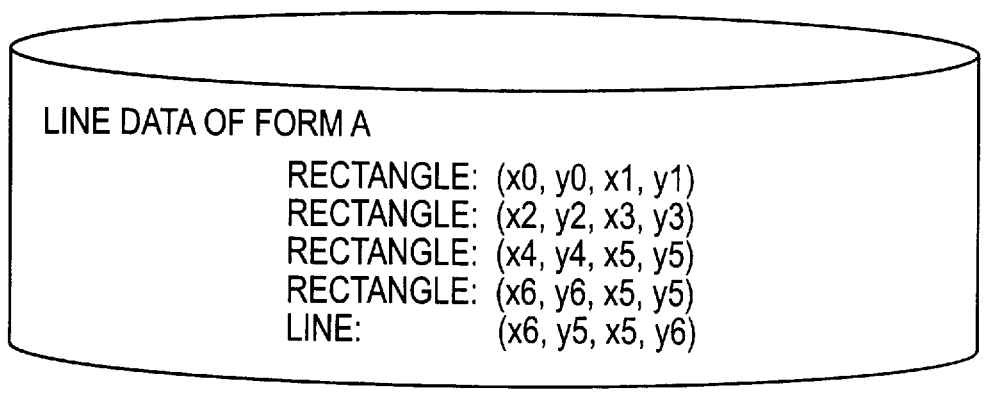
FIG. 8 is a schematic diagram of an example of extracted line data.
Figures 9, 10:
FIG. 9 is a schematic diagram of an example of extracted character data.
FIG. 10 is a schematic diagram of an example of extracted image data.

FIG. 6 is a flow chart of extraction processing of a character and FIG. 7 is a schematic diagram of an example of the form registered in the document filing apparatus. In FIG. 7, each line, coordinate value of the character, and an area of image data i are shown. Firstly, the character frame shown in FIG. 7 is extracted (step S21). Next, each character in the frame is recognized (step S22). As for the recognized character, its coordinate value and character codes are outputted (step S24). FIG. 8 is a schematic diagram of an example of extracted line data. As for the line data corresponding to a rectangle, the coordinate values of four corners of the rectangle are outputted. As for other kinds of the line data, coordinate values of a start point and an end point are outputted. On the other hand, as for a black pixel area which is not recognized as a character, the image data of the area is outputted instead of character codes (step S23,S25). FIG. 9 is a schematic diagram of an example of extracted character data and FIG. 10 is a schematic diagram of an example of extracted image data.

(step S3)

After the character/line extraction processing finishes, the retrieval section 5 retrieves the registered form (form B) similar to the new form (form A) from the file memory section 4. The similar form is the form whose content is not so different from that of the new form.

Alternatively, in this retrieval processing, all forms registered in the file memory section 4 are sequentially displayed and a user may select one form similar to the new form.

When a form is registered in the file memory section 4, a predetermined mark is attached to an item in the form, which represents the kind of the form. In this case, when all of the registered forms are evaluated during retrieved processing, the character data of the item to which the mark is attached is checked. If the character data of the item of the registered form is the same as the character data of the same item of the new form, the registered form is outputted as the similar form.

(step S4)

If the form B similar to the new form A is registered in the file memory section 4, difference data between the form A and the form B is calculated and next step S5 is executed. If the form B is not registered in the file memory section 4, next step S7 is executed to register the form A itself. In case that other forms are not registered in the file memory section 4, step S7 may be executed without step S3.

(step S5)

When the similar form B is retrieved at step S3, the document data difference detection section 3 calculates difference of the image data between the new form A and the similar form B. Firstly, an element corresponding to the form A is searched from figure data of the form B. In this searching, the position of data on the form A is adjusted to position of data of the form B. In short, coordinate values of figures are converted so that the form A and the form B overlap each other. Next, the figure data of the form A which does not overlap that of the form B is detected. As for the character data, if the coordinate value of a character of the form A does not coincide with that of the form B or if the character code of the form A does not coincide with that of the form B, the character data is outputted as difference data. As for partial image data, an exclusive OR between the image of the form A and image of the form B, whose coordinate value overlaps each other, is calculated. Then, the number of black pixels as a result of the exclusive OR is counted. If the number of black pixels is above a threshold value, the partial image data corresponding to the black pixels is decided as an image element different from that of the form B.

A position adjustment method between the form A and the form B is executed as follows. Firstly, in the coordinate values of line data of the form A, maximum and minimum of (x,y) coordinate values are determined.

In the example of FIG. 8, those are the following values.

minimum of x coordinate value x0
minimum of y coordinate value y0
maximum of x coordinate value x5
maximum of y coordinate value y5

Figure 11A:
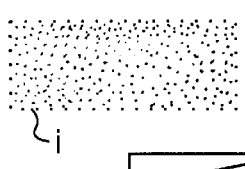
FIGS. 11(a)–(c) are schematic diagrams of an example of detection processing of differences between two forms.
Figure 11B:
Figure 11C:
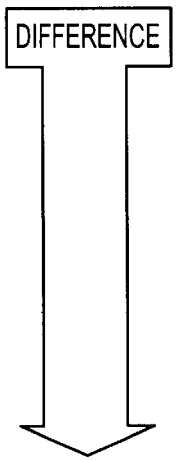
Figure 11C:
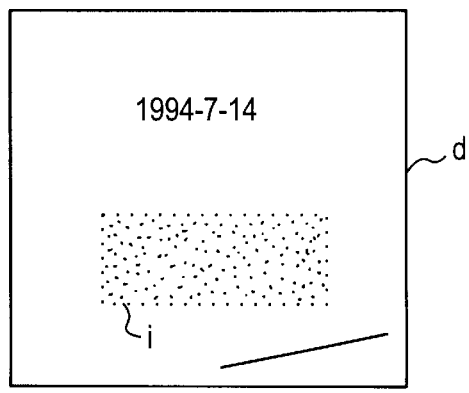

In the same way, as for the form B, maximum and minimum of (x,y) coordinate values are selected from coordinate values of the line data. Next, the line data of the form A is enlarged or reduced so the maximum and the minimum of the form A overlap those of the form B. The coordinate value of a character of the form A enlarges or reduces in the same way. Therefore, the size of the form A coincides with the size of the form B (coordinate values of the four corners between the form A and the form B overlaps each other). In the example of FIGS. 11(a)-(c), one slant line, one character line "1994-7-14" and one image area i are detected as difference data d.

(step S6)

Figure 12:
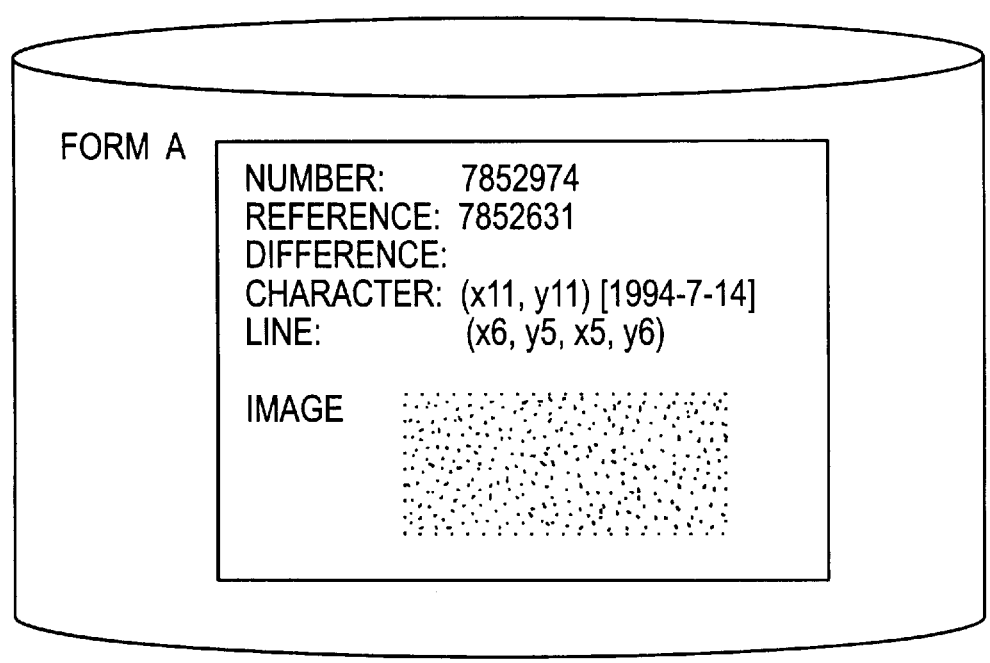
FIG. 12 is a schematic diagram of an example of registered form data.

When the difference data between the form A and the similar form B is detected, the difference data and specified information of the form B (form number) are registered in the file memory section 4. FIG. 12 is a schematic diagram of an example of registered form data. The form A is comprised of a number of the form A, a number (reference) of the similar form B, and the difference data (character, line, image) between the form A and the form B. Therefore, the form A is reconstructed by combining the form B and the difference data.

(step S7)

If there is no form B similar to the new form A registered in the file memory section 4, the character data, the line data and the image data of the new form A are registered in the file memory section 4.

Therefore, by registering the new form A data as difference data between the new form A and the registered form B, the data quantity for registering the new form A is greatly reduced in comparison with the registering method of the prior art.

In the first embodiment, by inputting a blank form whose format is similar to that of the registered form to be retrieved, the similar form is automatically retrieved from the file memory section 4. In this method, firstly the user inputs the blank form (form C) whose format is similar to that of the registered form to be retrieved through the image input section 1. Next, the character line extraction section 2 extracts line/character data from the input image of the form C. The line data and the character data are the same as those of the registered form to be retrieved, and used as a retrieval key. Therefore, by inputting the blank form to be retrieved, the similar form B is easily retrieved according to the format data (line, character).

(Second embodiment)

Figure 13:
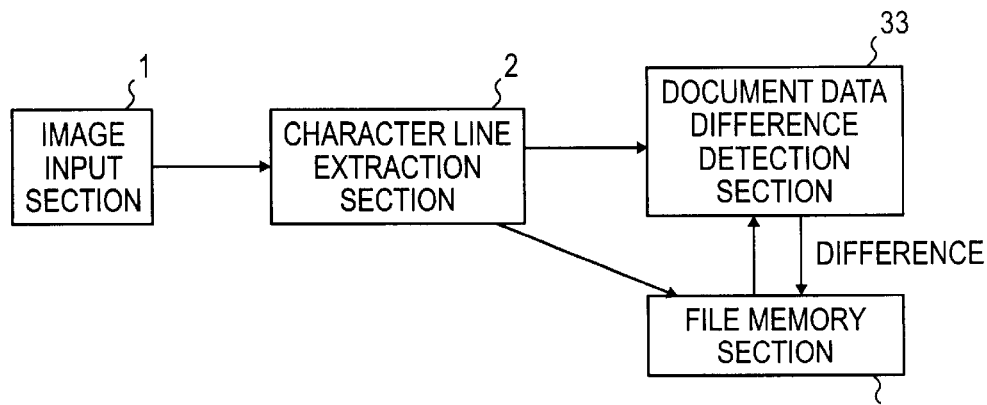
FIG. 13 is a schematic diagram of the document filing apparatus according to a second embodiment of the present invention.

In the second embodiment, the difference data between new form A and each registered form is respectively detected for all registerd forms in the file memory section 4. Then, the registered form whose difference is the smallest among those of all registered forms is selected as the similar form B. FIG. 13 is a schematic diagram of the document filing apparatus according to the second embodiment. In FIG. 13, the image input section 1, the character line extraction section 2 and the file memory section 4 are the same as those of the first embodiment shown in FIG. 1. The specific feature of the second embodiment is executed by a document data difference detection section 33.

Figure 14:
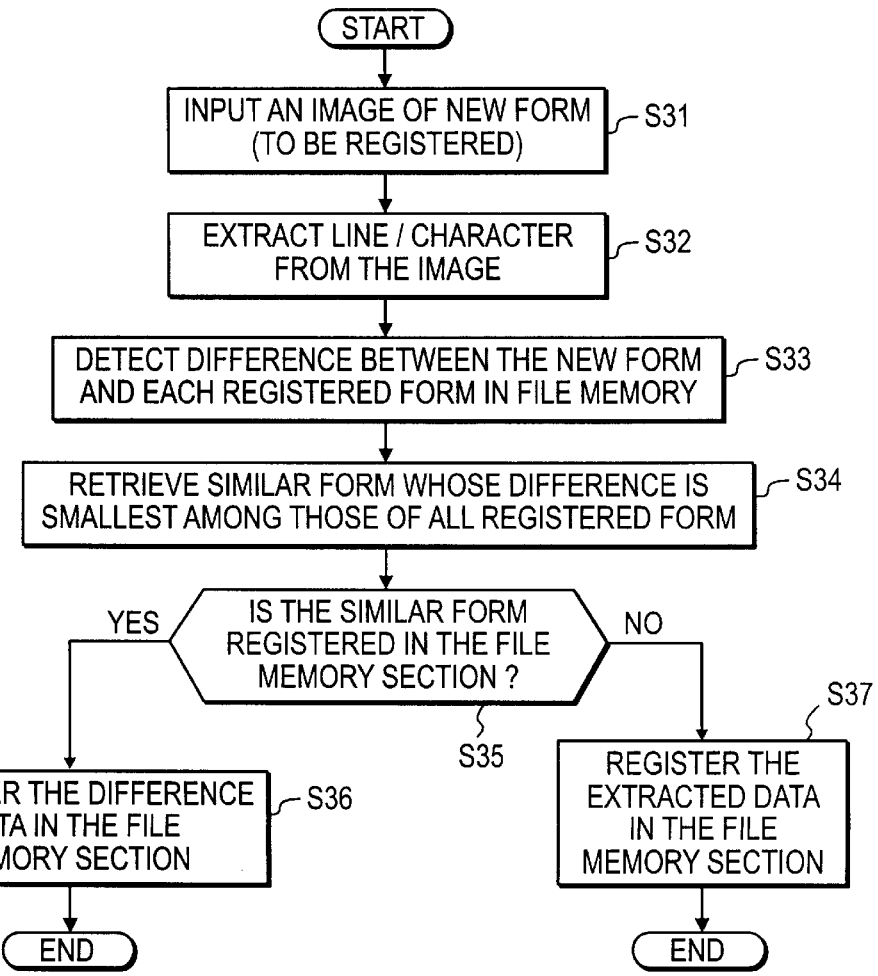
FIG. 14 is a flow chart of processing according to the second embodiment.

FIG. 14 is a flow chart of processing according to the second embodiment. In FIG. 14, steps S31,S32,S35,S36,S37 are the same as steps S1,S2,S4,S6,S7 shown in FIG. 3, respectively. Steps S33,S34 are different from those of the first embodiment.

(step S33)

As for all of the registered forms in the file memory section 4, the document data difference detection section 33 detects a difference between the new form A and each registered form, respectively. In this case, the difference of the image data between the new form A and each registered form may be firstly detected and a group of candidates of similar form B may be firstly selected.

(step S34)

By comparing the difference value determined for all of the registered forms, one registered form whose difference value is smallest among all difference values is selected as the similar form B. However, if the smallest difference is above a threshold value, it is decided at step S35 that the similar form B is not registered in the file memory section 4. In this case, the line data, the character data and the image data of the new form A are registered in the file memory section 4 at step S37.

(Third embodiment)

Figure 15:
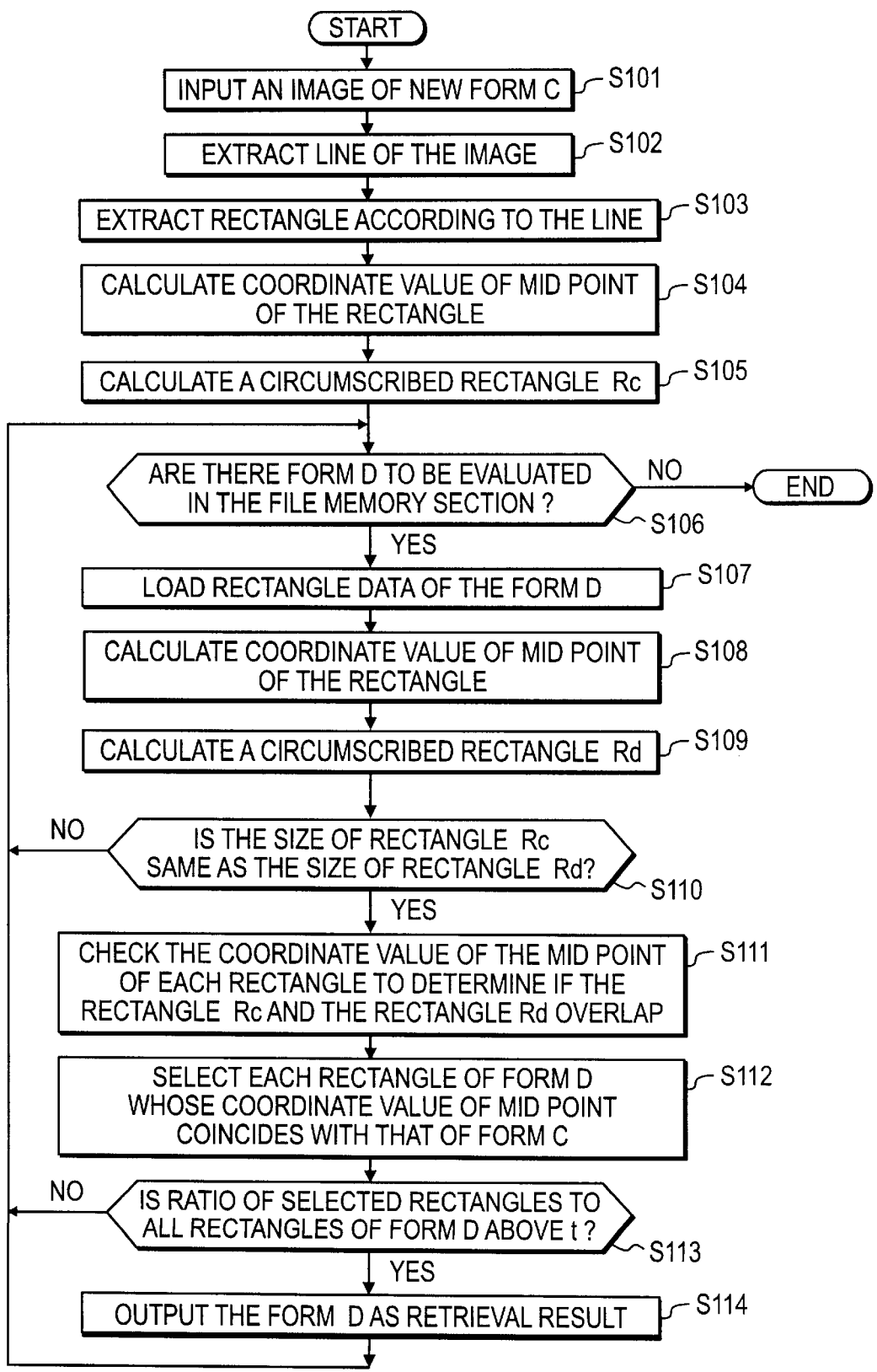
FIG. 15 is a flow chart of processing according to a third embodiment of the present invention.
Figure 16A:
FIGS. 16(a)–(d), FIGS. 17(a)–(b), FIGS. 18(a)–(b), and FIGS. 19(a)–(b) are schematic diagrams of examples of processing according to the third embodiment.
Figure 16B:
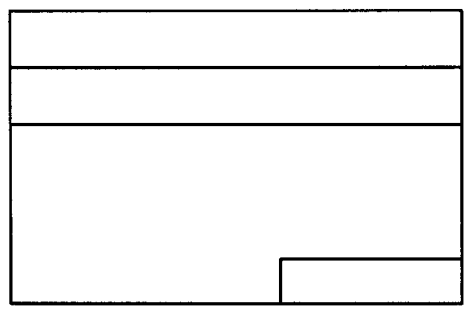
Figure 16C:
Figure 16D:
Figure 16D:
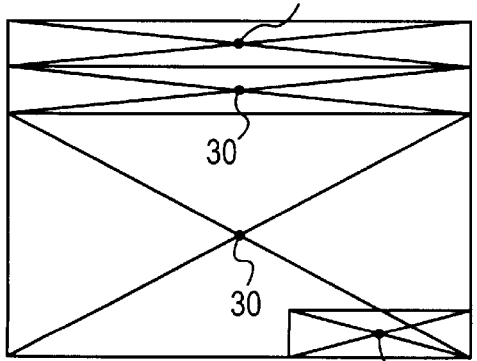
Figure 16D:
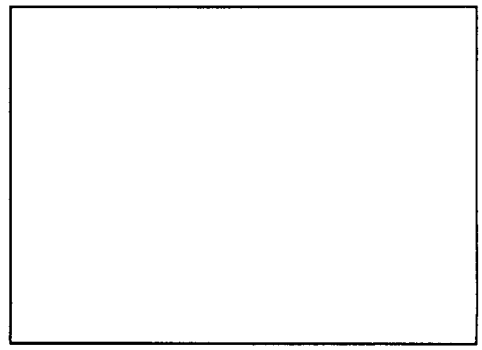

In the data filing apparatus comprised of the image input section 1, the character line extraction section 2, the document data difference detection section 3 and the file memory section 4, the processing for retrieving the similar form by inputting a blank form will be explained in detail. FIG. 15 is a flow chart of processing according to the third embodiment and FIGS. 16(a)-(d) are schematic diagrams of one example of processing of the blank form C. Firstly, the image input section 1 inputs the blank form C shown in FIG. 16(a) as the image data (step S101). Next, the character line extraction section 2 extracts lines from the image of the form C (step S102) and extracts plural rectangles representing the frame of the form C according to the extracted lines as shown in FIG. 16(b) (step S103). Then, as shown in FIG. 16(c), the coordinate value of a mid-point 30 of each rectangle is calculated (step S104) and a circumscribed rectangle including all rectangles in the form C is detected as shown in FIG. 16(d) (step S105). In FIG. 16(c), each mid-point 30 corresponds to each rectangle respectively in FIG. 16(b).

On the other hand, as for the registered forms in the file memory section 4, the extraction process of plural rectangles from each form was executed in the same way at the time each form was registered. Therefore, the circumscribed rectangle and mid-point of each rectangle are extracted for each registered form. In this case, the registered form in the file memory section 4 is designated form D. Firstly, plural rectangles of the form D are read from the file memory section 4 (step S107), and the coordinate value of the mid-point of each rectangle is calculated (step S108). Then, a circumscribed rectangle including all rectangles in the form D is detected (step S109). The size of the circumscribed rectangle of the form C is compared with the size of the circumscribed rectangle of the form D (step S110). If the size of the form C does not coincide with the size of the form D, the form D is decided not to be the similar form of the form C. In this case, the processing is returned to step S106 to evaluate the next form D in the same way. If the size of the form C coincides with the size of the form D (step S110), coordinate values of the mid-point of each rectangle of the form D are checked to determine if the form D a d the form C overlap according to coordinate values of the mid-points of each rectangle of the form C (step S111).

Next, the rectangles of the form D whose coordinate values of mid-point coincide with those of the form C are selected (step S112). If the ratio of the number of selected rectangles to the total number of rectangles of the form D is above "t%", the form D is determined to be the same as the form C (step S113) and outputted as the retrieval result (step S114). On the other hand, if the ratio is not above "t%", the form D is decided not to be same as the form C. In this case, the processing is returned to step S106 to evaluate the next form D in the same way. If there is not a next form D in the file memory section 4 at step S106, the processing finishes with a non-retrieval result.

Figure 17B:
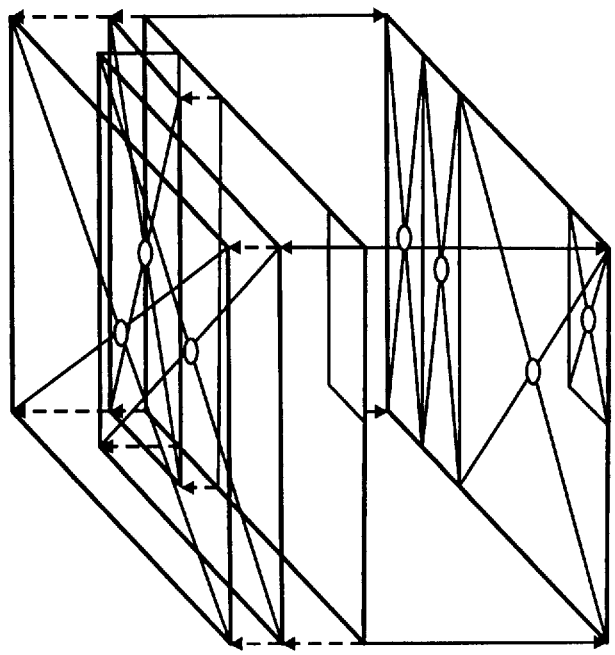
Figure 17A:
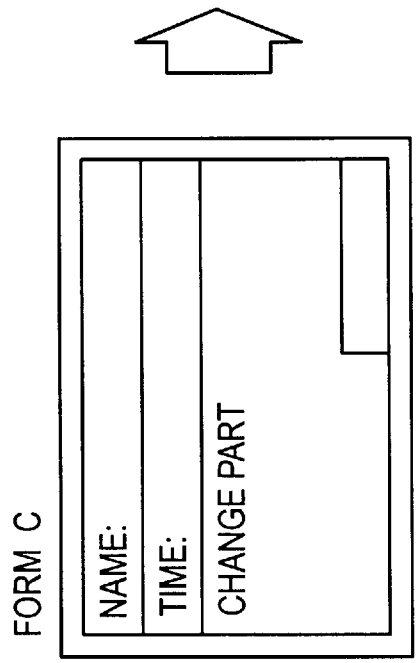
Figure 18A:
Figure 18B:
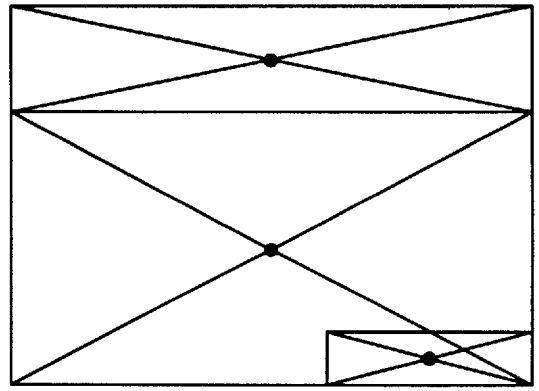

It may happen that the circumscribed rectangle is not extracted correctly from the form because various kinds of information are written in the form. In this case, extraction processing of the rectangles and the mid-points is extended as follows. Firstly, after the coordinate value of the mid-point of each rectangle of the new form C is calculated, a new rectangle is created by combining the neighboring rectangles. Then, a coordinate value of a mid-point of the new rectangle is also calculated. As shown in FIGS. 17(a) and (b), a first new rectangle is created by combining the "NAME" rectangle and "TIME" rectangle. A second new rectangle is created by combining the "TIME" rectangle and "CHANGE PART" rectangle. A third new rectangle is created by combining the "NAME" rectangle, "TIME" rectangle and "CHANGE PART" rectangle. In this case, even if a registered form D1 includes incomplete rectangles for "NAME, TIME" because of a partial line, such as shown in FIG. 18(a), a new rectangle is created by combining the incomplete rectangle "NAME" and incomplete rectangle "TIME". Then, a coordinate value of the mid-point of the new rectangle is calculated as shown in FIG. 18(b). Therefore, if the coordinate value of the mid-point of the new rectangle of the registered form D1 in FIG. 18(b) coincides with the coordinate value of the mid-point of the new rectangle of the new form C in FIG. 17(b), the registered form D1 is determined to be similar to the new form C.

Figure 19A:
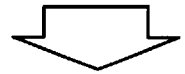
Figure 19B:
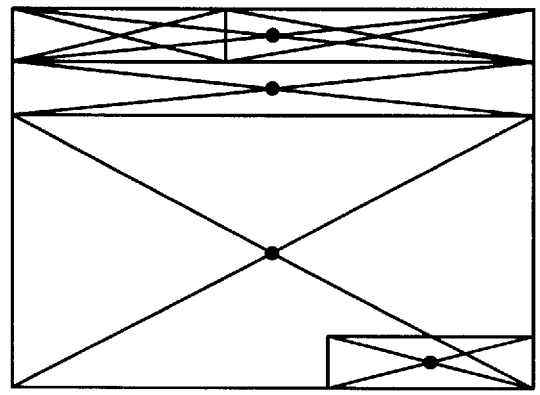

In the case that two extra rectangles "NAME" of a registered form D2 are detected because an unnecessary line is included as shown in FIG. 19(a), a new rectangle "NAME" without the unnecessary line is created in the form D2 and a coordinate value of the mid-point of the new rectangle is calculated as shown is FIG. 19(b). If the coordinate value of the mid-point of the new rectangle of the registered form D2 in FIG. 19(b) coincides with the coordinate value of the mid-point of the new rectangle of the new form C in FIG. 17(b), the registered form D2 is determined to be similar to the new form C.

In the third embodiment, it may be decided whether character data of the registered form D coincides with character data of the new form C or not. As another retrieval method, a user selects the new form C similar to the registered form to be retrieved. Then, a plurality of characters and lines are extracted from the new form C and the user selects the character and line used as the retrieval key from the plurality of selected characters and lines. In this case, the registered form including the selected character and line is only retrieved from the file memory section 4.

Additional advantages and modifications will readily occur to those skilled in the art. The invention in its broader aspects is therefore not limited to the specific details, representative apparatus and methods, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. Document filing apparatus comprising:

file means for storing a plurality of documents having line data, character data and image data;

image input means for inputting image data of a new document;

character-line extraction means for extracting line data and character data from the input image data;

document retrieval means for retrieving from the file means one of the stored documents to be compared with the new document, the one of stored documents being similar to the new document;

difference detection means for detecting differences of line data, character data, and image data between the new document and the retrieved document, said differences called difference data; and register means for registering the difference data and identification information of the retrieved document as the new document in said file means or for registering line data, character data and image data of the new document in said file means, if there is no stored document that compares to the new document.

2. Document filing apparatus according to claim 1, wherein the document retrieval means, upon determining that one of said stored documents is similar to the new document, retrieves the one of the stored documents.

3. Document filing apparatus according to claim 1, wherein each of the stored documents has associated therewith a predetermined mark representing a kind of form of the associated document, and the document retrieval means retrieves the stored document to be compared with the new document from the file means in accordance with the predetermined mark.

4. Document filing apparatus according to claim 1, wherein the image input means inputs a blank form whose line and character data are similar to those of a document to be retrieved in the file means.

5. Document filing apparatus according to claim 4, wherein the character-line extraction means extracts line data and character data from the blank form, and the document retrieval means retrieves documents from the file means according to the line data and the character data extracted from the blank form.

6. Document filing method comprising the steps of:

storing in a file means a plurality of documents having line data, character data and image data;

inputting a new document as image data;

extracting line data and character data from the input image data of the new document;

retrieving from the file means one of said stored documents to be compared with the new document, the one of said stored documents being similar to the new document;

detecting differences of line data, character data, and image data between the new document and the retrieved document, the differences being called difference data; and registering in the file means, either the difference data and identification information of the retrieved document as the new document or registering line data, character data and image data of the new document if there is no stored document that is similar to the new document.

7. Document filing apparatus, comprising:

file means for storing a plurality of documents having line data, character data and image data;

image input means for inputting image data of a new document;

character-line extraction means for extracting line data and character data from the input image data;

difference detection means for calculating difference data between the new document and each document stored in said file means, and for determining the one of the stored documents for which the difference data is smallest; and register means for registering the difference data and identification information for the determined document as the new document in said file means.

8. Document filing apparatus according to claim 7, wherein the register means registers the line data, character data, and image data of the new document when the smallest difference data is greater than a predetermined threshold.

9. Document filing method comprising the steps of:

storing in file means a plurality of documents having line data, character data and image data in file means;

inputting a new document as image data;

extracting line data and character data from the input image data of the new document;

calculating difference data between the new document and each document stored in said file means;

determining the one of the stored documents for which the difference data is smallest; and registering in the file means the difference data and identification information for the determined document as the new document.

10. Document filing apparatus, comprising:

file means for storing image data of a plurality of documents;

image input means for inputting imaga data of a new document;

extraction means for extracting line data from the new document input image data and extracting ones of the plurality of rectangles included in the new document according to the line data;

rectangle calculation means for calculating a coordinate value of a mid-point of each extracted rectangle, and for calculating a circumscribed rectangle which includes the plurality of rectangles;

document retrieval means for retrieving image data of one of the stored documents from the file means, for calculating coordinate values of mid-points of a plurality of rectangles of the retrieved document, and for calculating a circumscribed rectangle which includes the plurality of the rectangles of the retrieved document;

means for determining if a size of the circumscribed rectangle of the new document is the same as a size of the circumscribed of the retrieved document and, if the same size, for checking if the coordinate value of the mid-point of each rectangle of the new document overlaps the mid-point of each rectangle of the retrieved document;

selection means for selecting rectangles of the retrieved document whose mid-point coordinate value coincides with one of the mid-point coordinate values of the new document; and output means for, if a selection ratio of a number of the selected rectangles to a total number of all rectangles of the retrieved document is above a threshold value, outputting the retrieved document as a retrieval result.

11. Document filing apparatus according to claim 10, wherein the document retrieval means retrieves image data of another one of the stored documents from the file means, if the size of the circumscribed rectangle of the new document is not the same as the size of the circumscribed rectangle of the retrieved document or if the selection ratio is not above the threshold value.

12. Document filing apparatus according to claim 10, wherein the rectangle calculation means calculates the coordinate value of a mid-point of a unified rectangle formed from neighboring rectangles in the new document, and the checking means checks the coordinate value of the mid-point of the unified rectangle.

13. Document filing apparatus according to claim 10, wherein the selection means selects the unified rectangle if the coordinate value of the mid-point of the unified rectangle coincides with the coordinate value of the mid-point of one of the rectangles of the retrieved document.

14. Document filing method comprising the steps of:

storing in file means image data of a plurality of documents;

inputting image data of a new document;

extracting line data from the input image data and a plurality of rectangles included in the new document according to the line data;

retrieving image data of one of the stored documents from the file means;

calculating a coordinate value of a mid-point of each extracted rectangle and a circumscribed rectangle which includes the plurality of rectangles;

calculating coordinate values of mid-points of a plurality of rectangles of the retrieved document and calculating a circumscribed rectangle which includes the plurality of rectangles of the retrieved document;

determining if a size of the circumscribed rectangle of the new document is the same as a size of the circumscribed rectangle of the retrieved document;

checking, in case of the same size, if the coordinate value of the mid-point of each rectangle of the new document overlaps the mid-point of each rectangle of the retrieved document;

selecting rectangles of the retrieved document whose mid-point coordinate value coincides with one of the mid-point coordinate values of the new document; and outputting the retrieved document as a retrieval result, if a ratio of a number of the selected rectangles to a total number of all rectangles of the retrieved document is above a threshold value.

15. A program storage device readable by a computer in a computer system, including a program of instructions executable by the computer to perform method steps, wherein said computer system includes a file means which stores a plurality of documents having line data, character data, and image data, said method steps comprising:

extracting line data and character data from an input image data of a new document;

retrieving from the file means one of said stored documents to be compared with the new document, the one of said stored documents being similar to the new document;

detecting differences of line data, character data, and image data between the new document and the retrieved document, the differences called difference data; and registering in the file means either the difference data and identification information of the retrieved document as the new document or registering line data, character data, and image data of the new document if there is no stored document that is similar to the new document.

16. A program storage device readable by a computer in a computer system, including a program of instructions executable by the computer to perform method steps, wherein said computer system includes a file means which stores a plurality of documents having line data, character data and image data, said method steps comprising;

storing in file means a plurality of documents having line data, character data and image data in file means;

inputting a new document as image data;

extracting line data and character data from the input image data of the new document;

calculating difference data between the new document and each document stored in said file means;

determining the one of the stored documents for which the difference data is smallest; and registering in the file means the difference data and identification information for the determined document as the new document.

17. A program storage device readable by a computer in a computer system, including a program of instructions executable by the computer to perform method steps, wherein said computer system includes a file means which stores a plurality of documents having line data, character data and image data, said method steps comprising;

extracting line data from an input image data of a new document and a plurality of rectangles included in the new document according to the line data;

retrieving image data of one of the stored documents from the file means;

calculating a coordinate value of a mid-point of each extracted rectangle and a circumscribed rectangle which includes the plurality of rectangles;

calculating coordinate values of mid-points of a plurality of rectangles of the retrieved document and calculating a circumscribed rectangle which includes the plurality of rectangles of the retrieved document;

determining if a size of the circumscribed rectangle of the new document is the same as a size of the circumscribed rectangle of the retrieved document;

checking, in case of the same size, if the coordinate value of the mid-point of each rectangle of the new document overlaps the mid-point of each rectangle of the retrieved document;

selecting rectangles of the retrieved document whose mid-point coordinate value coincides with one of the mid-point coordinate values of the new document; and outputting the retrieved document as a retrieval result, if a ratio of a number of the selected rectangles to a total number of all rectangles of the retrieved document is above a threshold value.

* * * * *